US006591613B2

(12) United States Patent
Simunek

(10) Patent No.: US 6,591,613 B2
(45) Date of Patent: Jul. 15, 2003

(54) METHODS FOR OPERATING GAS TURBINE ENGINES

(75) Inventor: James William Simunek, Cincinnati, OH (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/809,711

(22) Filed: Mar. 15, 2001

(65) Prior Publication Data

US 2003/0089113 A1 May 15, 2003

(51) Int. Cl.$^7$ ................................................ F02C 9/28
(52) U.S. Cl. ...................................... 60/773; 60/39.281
(58) Field of Search ............................... 60/773, 39.281

(56) References Cited

U.S. PATENT DOCUMENTS

| | | |
|---|---|---|
| 3,854,287 A | 12/1974 | Rembold |
| 4,313,167 A | 1/1982 | Brown |
| 4,328,666 A | 5/1982 | Cummins, Jr. |
| 4,467,599 A | 8/1984 | Moore |
| 4,783,026 A | 11/1988 | Rumford et al. |
| 4,831,819 A | 5/1989 | Norris et al. |
| 5,133,182 A | 7/1992 | Marcos |
| 5,142,860 A * | 9/1992 | Strange et al. ........... 60/39.281 |
| 5,596,130 A | 1/1997 | Wright et al. |
| 5,621,154 A | 4/1997 | Wright et al. |
| 5,622,045 A | 4/1997 | Weimer et al. |
| 6,250,061 B1 | 6/2001 | Orlando |

FOREIGN PATENT DOCUMENTS

EP 88630013.6 8/1988

* cited by examiner

Primary Examiner—Louis J. Casaregola
(74) Attorney, Agent, or Firm—Nathan D. Herkamp; Robert B. Reeser, III; Armstrong Teasdale LLP

(57) ABSTRACT

A fuel control system for a gas turbine engine includes logic that is used to facilitate enhanced compressor stall margin when the engine is operating in potential icing conditions is described. The fuel control system is coupled to at least one fuel regulator within the engine, and receives input from a plurality of sensors coupled to the engine. More specifically, the system receives input from environmental sensors, as well as inputs representing compressor inlet temperature, compressor discharge pressure, and corrected core engine speed. Furthermore, the fuel control system also receives input from the other engine fuel regulators.

5 Claims, 2 Drawing Sheets

METHODS FOR OPERATING GAS TURBINE ENGINES

BACKGROUND OF THE INVENTION

This invention relates generally to gas turbine engines, and more particularly, to methods and apparatus for operating gas turbine engines.

Gas turbine engines typically include high and low pressure compressors, a combustor, and at least one turbine. The compressors compress air which is mixed with fuel and channeled to the combustor. The mixture is then ignited for generating hot combustion gases, and the combustion gases are channeled to the turbine which extracts energy from the combustion gases for powering the compressor, as well as producing useful work to propel an aircraft in flight or to power a load, such as an electrical generator.

Because gas turbine engines must be capable of operating in a plurality of operating conditions, the engines include control systems to control engine operations. More specifically, the control systems compare inputs received from engine parameters, such as rotational speed of a fan, to power management schedules preloaded in the control systems.

When engines operate in icing conditions, ice may accumulate on the low pressure compression system of the engine. More specifically, if such engines are operated within icing conditions at low power for extended periods of time, ice accumulation within the engine may be significant. Over time, continued operation of the engine, or a throttle burst from lower power operations to higher power operations, may cause the accumulated ice build-up to separate from the low pressure compression system and be ingested by the high pressure compressor. Such a condition is known as an ice shed, and may cause compressor discharge temperature to be suddenly be reduced. In response to the sudden decrease in compressor discharge temperature, the corrected core speed increases in the aft stages of the high pressure compressor. This sudden increase in aft stage corrected core speed ma adversely impact compressor stall margin.

BRIEF SUMMARY OF THE INVENTION

In an exemplary embodiment, a fuel control system for a gas turbine engine includes logic used to facilitate enhanced compressor stall margin when the engine is operating in potential icing conditions. The fuel control system is coupled to at least one fuel regulator within the engine, and receives input from a plurality of sensors coupled to the engine. More specifically, the system receives input from environmental sensors, as well as inputs representing compressor inlet temperature, compressor discharge pressure, and corrected core engine speed. In addition, the fuel control system also receives input from other engine fuel regulators.

During operation, the fuel control system determines a maximum fuel flow deviation in response to inputs received from the engine and environmental sensors. The maximum fuel flow deviation is scaled in response to inputs received from the environmental sensors, and is used to determine fuel regulator priority selection and a commanded fuel flow. The commanded fuel flow is adjusted to be maintained within pre-defined maximum and minimum fuel flow demand limits. As a result, the fuel control system facilitates enhanced compressor stall margin when the engine is operating in potential icing conditions, and thus eliminates compressor stall margin shortfalls that may occur following a compressor ice shed event.

DETAILED DESCRIPTION OF THE INVENTION

Figure 1:
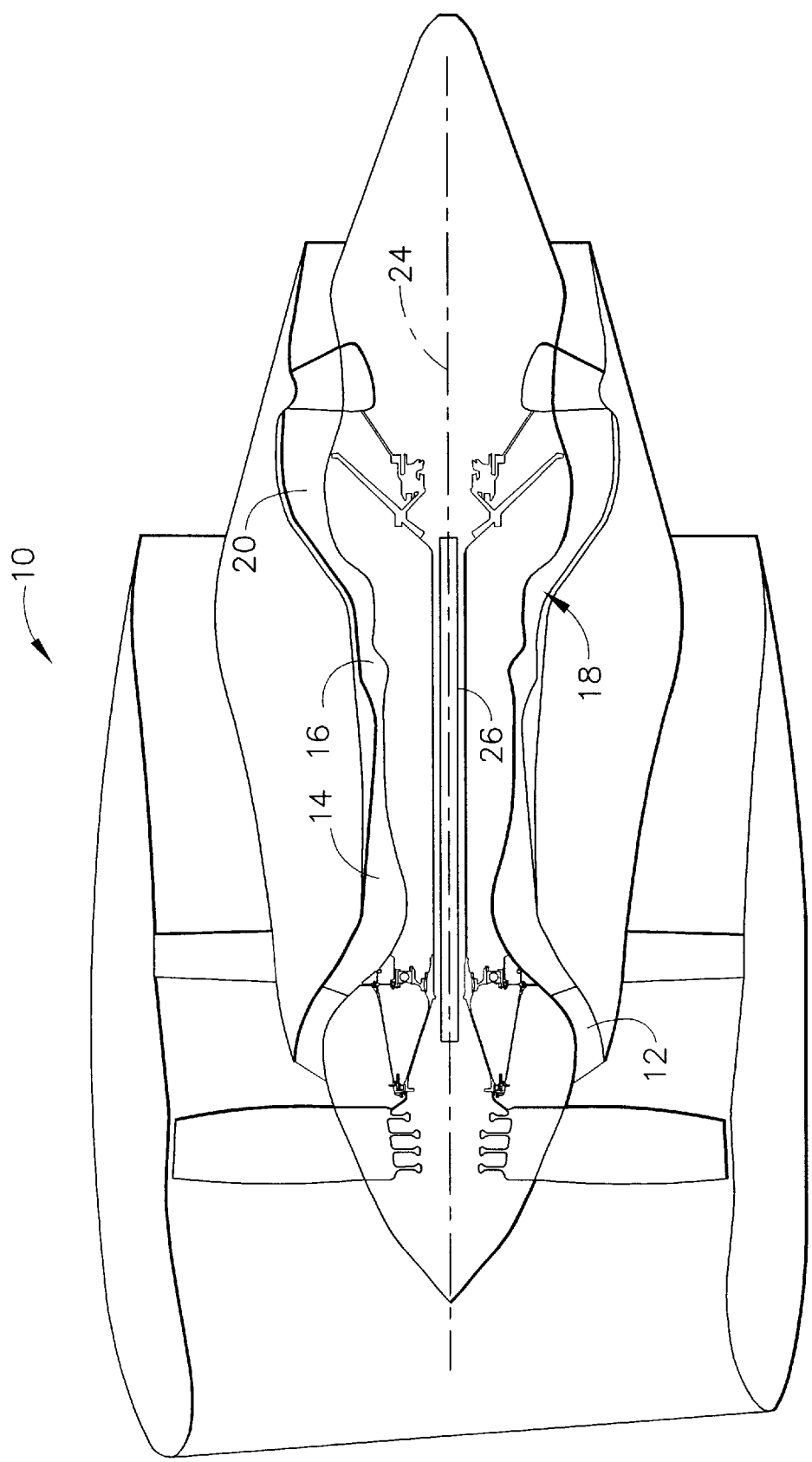
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, and a low pressure turbine 20. Compressor 12 and turbine 20 are coupled by a first rotor shaft 24, and compressor 14 and turbine 18 are coupled by a second rotor shaft 26. In one embodiment, engine 10 is a GE90 engine available from General Electric Aircraft Engines, Cincinnati, Ohio.

In operation, air flows through low pressure compressor 12 and compressed air is supplied from low pressure compressor 12 to high pressure compressor 14. Compressed air is then delivered to combustor 16 and airflow from combustor 16 drives turbines 18 and 20.

Figure 2:
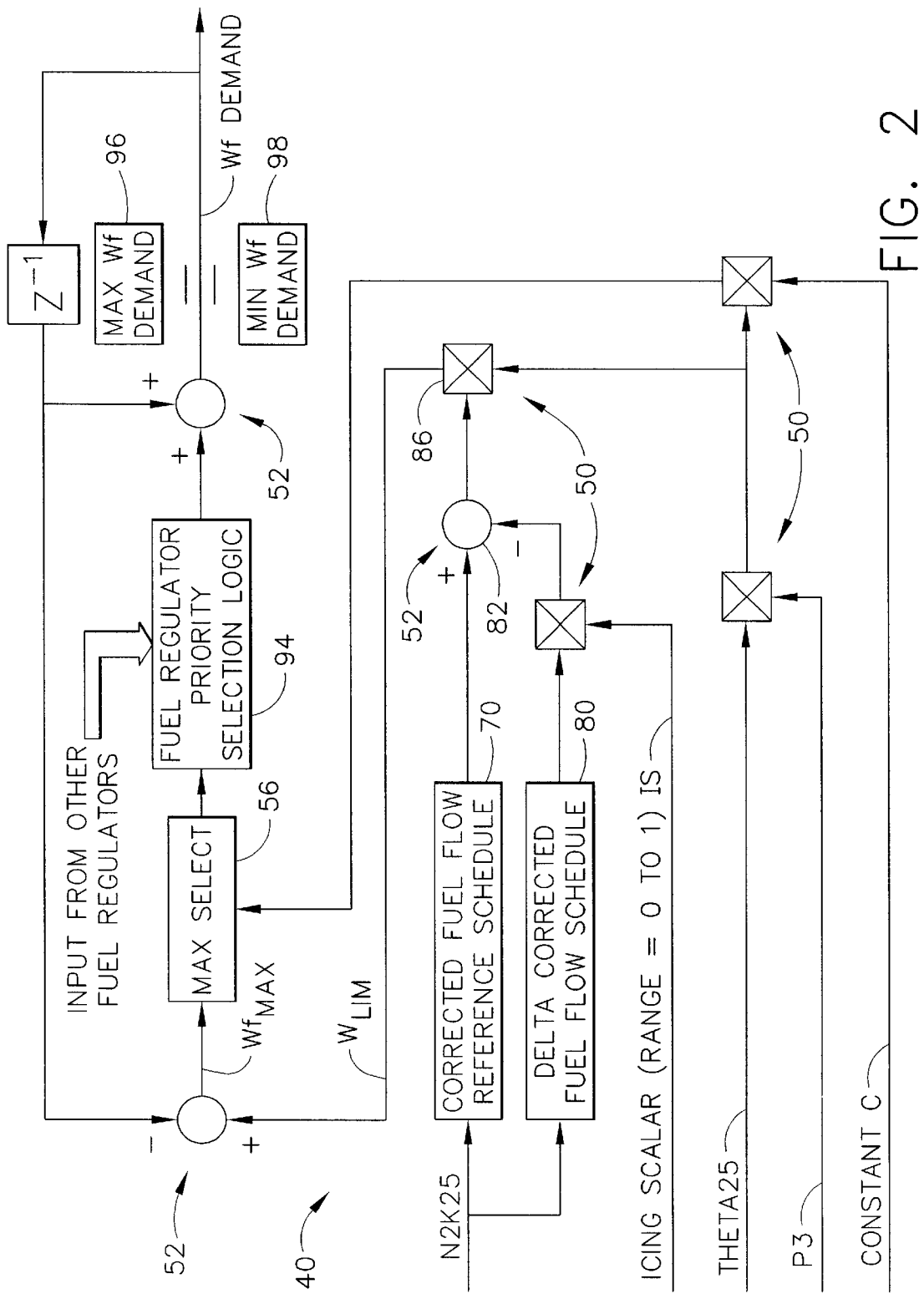
FIG. 2 is a logic diagram of a fuel control system for use with an aircraft engine.

FIG. 2 is a logic diagram of a fuel control system 40 for use with an aircraft engine, such as, aircraft engine 10 shown in FIG. 1. Alternatively, fuel control system 40 may be used with other types of gas turbine engines or power generating systems. More specifically, fuel control system 40 includes logic that facilitates enhanced compressor stall margin when the engine is operating in potential icing conditions. In an alternative embodiment, fuel control system 40 facilitates improved compressor stall margin when a reduced fuel schedule is used for other detected compressor destabilizing conditions. Fuel control system 40 is coupled to a processor-based engine control system. The term processor, as used herein, refers to microprocessors, application specific integrated circuits (ASIC), logic circuits, and any other circuit or processor capable of executing fuel control system 40 as described herein.

The engine includes a core engine portion (not shown), a plurality of sensors (not shown) that are responsive to engine operations, and a plurality of environmental sensors (not shown) for sensing environmental conditions, such as, but not limited to, ambient air temperature and altitude. Fuel control system 40 includes a plurality of multiplying junctions 50 and a plurality of summing junctions 52. Fuel control system 40 receives inputs for compressor discharge pressure P3 and a square root of compressor inlet pressure Theta 25. Fuel control system 40 also receives inputs for a corrected engine core speed N2K25, and a positive constant C. Constant C is variably selected and input into fuel control system 40 to ensure that the engine is not accelerated slower than a pre-determined rate. More specifically, this feature precludes engine 10 from "hanging-up" or failing to accelerate due to compressor operability logic of fuel control system 40. Accordingly, constant C is unique to the engine to which fuel control system 40 is electricall coupled.

Values representing square root of compressor inlet temperature Theta 25 and compressor discharge pressure P3 are multiplied together and the resulting product is then multiplied by constant C prior to being transmitted to a max select 56. A schedule of corrected fuel flow 70 is provided as a reference for use by fuel control system 40. Corrected fuel flow schedule 70 is consistent with an engine maximum corrected fuel flow schedule and provides compressor stall margin in non-icing operating conditions. Fuel control system 40 determines a reference value from corrected fuel flow schedule 70 in response to corrected engine core speed N2K25 input to fuel control system 40.

A value from a delta corrected fuel flow cutback schedule 80 is added with a summing junction 82 to the value selected from corrected fuel flow schedule 70. More specifically, delta fuel flow schedule 80 provides negative values that decrease allowable fuel enrichment provided to the engine. Furthermore, values provided by delta fuel flow schedule 80 are scaled by an icing scaling parameter IS selected in response to input from the environmental sensors. More specifically, icing scaling parameter is set to one when the engine, or an associated aircraft, is operating in potential icing conditions or within an icing threat envelope pre-defined within fuel control system 40, and is set to zero when the engine, or an associated aircraft, is operating in non-icing conditions or outside of the pre-defined icing threat envelope.

The output from summing junction 82 is multiplied at a multiplying junction 86 by square root of compressor inlet temperature Theta 25 and compressor discharge pressure P3 to generate a physical fuel flow limit $W_{LIM}$. A past fuel demand value $Z^{-1}$ is subtracted from physical fuel flow limit $W_{LIM}$ to generate a maximum fuel flow deviation $Wf_{max}$ which is input to max select 56. Max select 56 inputs maximum fuel flow deviation $Wf_{max}$ and also the multiplicative product of constant C, square root of compressor inlet temperature Theta 25, and compressor discharge pressure P3. The multiplicative product of constant C, square root of compressor inlet temperature Theta 25, and compressor discharge pressure P3 provides a constant rate of change of fan speed that is independent of altitude.

Max select 56 forces fuel flow deviation $Wf_{max}$ to always be a positive value, thus ensuring that a fuel control system fuel regulator (not shown) coupled to fuel control system 40 does not cause the engine to "hang-up" or stop accelerating in response to fuel demand Wf. As a result, engine 10 achieves demanded fan speed because the fuel control system regulator is only used for transient fuel control mode operation. Output from max select 56 is input to regulator priority selection logic 94. Regulator priority selection logic 94 also receives input from other engine fuel regulators and determines a fuel demand Wf for appropriate engine control regulator. More specifically, an output from max select 56 is added to a past fuel demand value $Z^{-1}$ and is adjusted to be within maximum and minimum fuel flow Wf demand limits 96 and 98, respectively. As a result, fuel control system 40 facilitates enhanced compressor stall margin when the engine is operating in potential icing conditions, and thus eliminates compressor stall margin shortfalls that may occur following a compressor ice shed event, or when a reduced fuel schedule is used with the engine. More specifically, fuel control system 40 facilitates limiting corrected core speed to prevent engine 10 from surging at high power following an ice shed ingestion.

The above-described fuel control system is cost-effective and highly reliable. The system receives input from a plurality of engine sensors coupled to the engine and determines a commanded fuel flow for a corresponding amount of thrust in response to such input. Furthermore, the system selects a controlled variable from a schedule memory storing a corrected fuel flow, in response to input from environmental sensors coupled to the engine. As a result, the fuel control system facilitates enhanced compressor stall margin when the engine is operating in potential icing conditions, and thus eliminates compressor stall margin shortfalls that may occur following a compressor ice shed event, or when a reduced fuel schedule is used with the engine.

While the invention has been described in terms of various specific embodiments, those skilled in the art will recognize that the invention can be practiced with modification within the spirit and scope of the claims.

What is claimed is:

1. A method for controlling an aircraft engine using a control system, the control system including a processor coupled to the aircraft engine, said method comprising the steps of
   receiving a plurality of current engine environmental operating conditions including a compressor discharge pressure from the aircraft engine, and a compressor inlet temperature from the aircraft engine;
   determining a reference value from a corrected fuel flow schedule;
   generating a fuel flow demand and a fuel flow deviation based on the reference value and the current engine environmental operating conditions; and
   controlling a fuel system regulator coupled to the aircraft engine in response to the fuel flow deviation.

2. A method in accordance with claim 1 wherein said step of generating a fuel flow demand further comprises the step of receiving engine sensor values used to generate the fuel flow demand, the engine sensor values include at least one of engine speed, a compressor discharge pressure, and a compressor inlet temperature.

3. A method in accordance with claim 2 wherein said step receiving engine sensor values further comprises the steps of:
   receiving an engine sensor value representing a compressor discharge pressure of the engine; and
   receiving an engine sensor value representing a compressor inlet temperature of the engine.

4. A method in accordance with claim 1 wherein said step of generating a fuel flow demand further comprises the steps of:
   providing priority selection logic in communication with the fuel system regulator; and
   using the regulator priority selection logic to determine a positive fuel flow deviation.

5. A method in accordance with claim 1 wherein said step of generating a fuel flow demand further comprises the steps of:
   receiving a fuel flow deviation;
   subtracting a past fuel flow demand value to ensure the fuel flow deviation is positive; and
   generating a fuel flow demand that is between pre-set upper and lower limits in response to the fuel flow deviation value.

* * * * *